United States Patent
Moretti et al.

(10) Patent No.: US 6,471,252 B1
(45) Date of Patent: Oct. 29, 2002

(54) RELEASABLE PLUG-IN CONNECTOR FOR HIGH PRESSURE LINES

(75) Inventors: Erminio Moretti; Daniel Martin-Cocher, both of Grenoble (FR)

(73) Assignee: A. Raymond & Cie (FR)

(*) Notice: Subject to any disclaimer, the term of this patent is extended or adjusted under 35 U.S.C. 154(b) by 0 days.

(21) Appl. No.: 09/581,303

(22) PCT Filed: Nov. 21, 1998

(86) PCT No.: PCT/EP98/07508

§ 371 (c)(1),
(2), (4) Date: Jun. 8, 2000

(87) PCT Pub. No.: WO99/31427

PCT Pub. Date: Jun. 24, 1999

(30) Foreign Application Priority Data

Dec. 16, 1997 (DE) .......................... 197 55 826

(51) Int. Cl.[7] .......................... F16L 37/00; F16L 39/00
(52) U.S. Cl. .................... 285/319; 285/305; 285/921
(58) Field of Search ................ 285/305, 319, 285/379, 921

(56) References Cited

U.S. PATENT DOCUMENTS

| 5,161,834 A | * | 11/1992 | Norkey ........................ 285/319 |
| 5,324,081 A | * | 6/1994 | Umezawa ................ 285/319 X |
| 5,350,203 A | * | 9/1994 | McNaughton et al. ...... 285/319 |
| 5,429,395 A | * | 7/1995 | Ketcham ................ 285/319 X |
| 5,538,297 A | * | 7/1996 | McNaughton et al. .. 285/305 X |
| 5,806,898 A | * | 9/1998 | Hollnagle ............... 285/319 X |

* cited by examiner

*Primary Examiner*—Neill Wilson
(74) *Attorney, Agent, or Firm*—Gifford, Krass, Groh, Sprinkle, Anderson & Citkowski, P.C.

(57) ABSTRACT

The invention relates to a detachable plug-and-socket connector for high pressure lines, particularly for brake lines in the manufacture of motor vehicles, where the plug-and-socket connector must have an especially high retaining force. The connector includes a plug-in part that has an annular retaining flange on its insertion side and is provided with a circular recess into which the end of a brake line tube can be pressed by deformable expansion of the tube wall and that the retaining spring is provided with a simple central clamping ring which can be slipped over the tubular connecting piece of the plug-in part immediately next to the retaining flange.

6 Claims, 2 Drawing Sheets

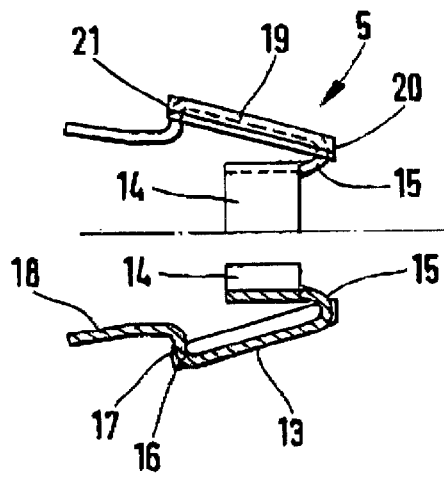
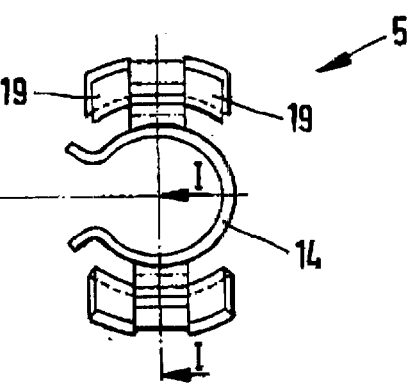
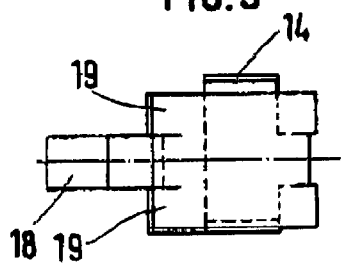
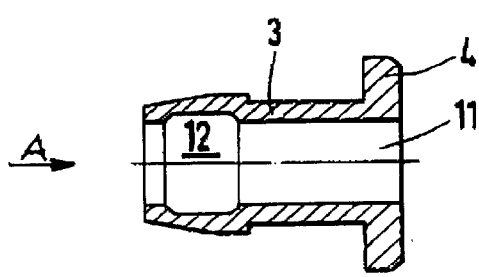
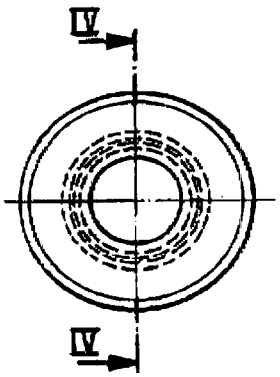
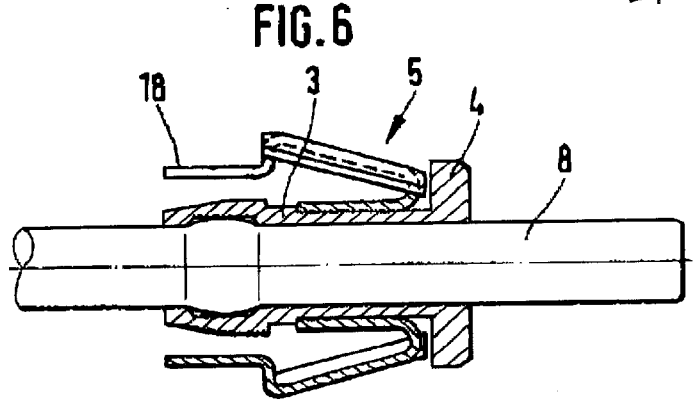

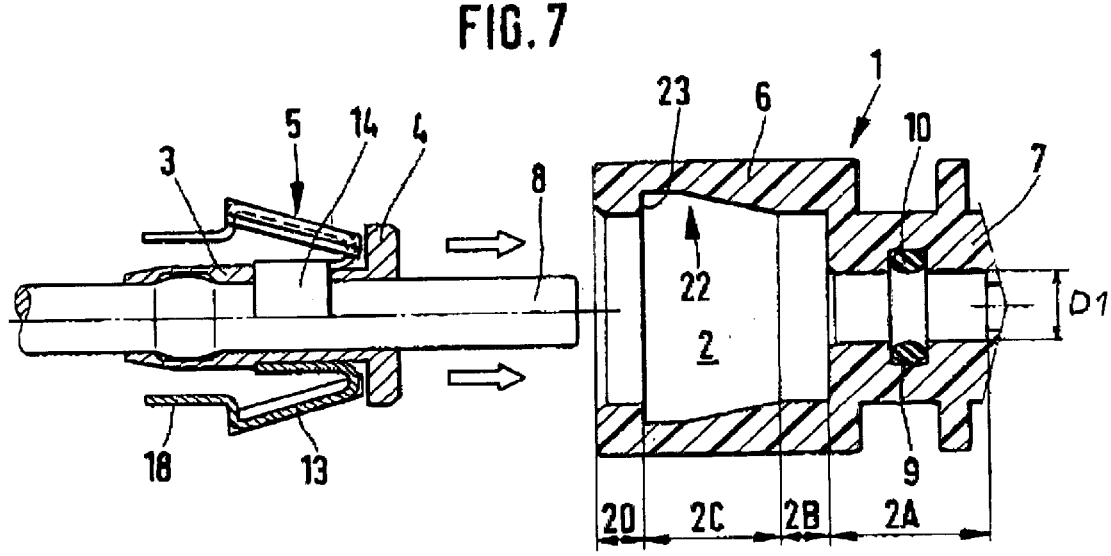
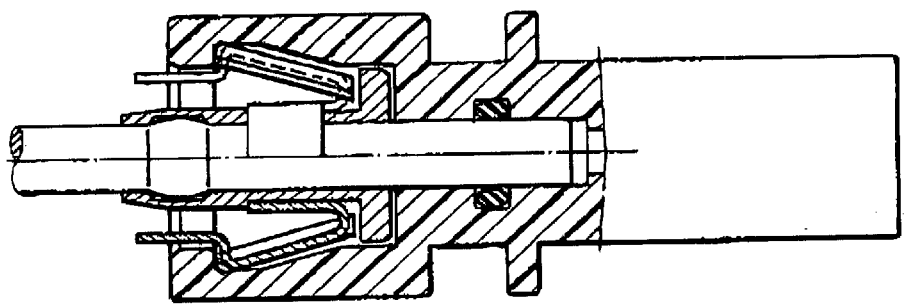
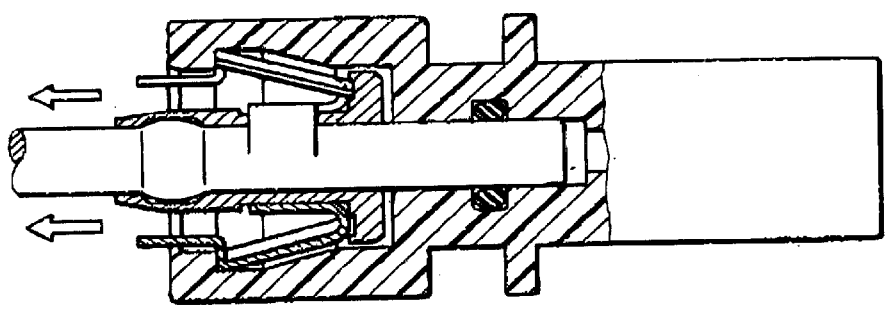

RELEASABLE PLUG-IN CONNECTOR FOR HIGH PRESSURE LINES

BACKGROUND OF THE INVENTION

1. Field of the Invention

The invention relates to a detachable plug-and-socket connector for high-pressure lines, particularly for brake lines in the manufacture of motor vehicles.

2. Reference to Related Art

Plug-and-socket connectors for use with high-pressure lines known from EP 0 532 242 A2; Typically, in order to withstand the high pressure of the brake fluid, a strong retaining spring of spring steel is required along with the mandatory gasket. In the prior art, conical elastic tabs are formed with their converging ends on an annular disk that supports the front side of the tubular plug-in part. In order to attach the plug-in part with retaining spring onto the end of the tubing stably, the tube wall expands deformably on both sides of the plug-in part in such a way that the ring of the retaining spring fits close, in the direction of insertion, to the back end wall of the plug-and-socket connector and is engaged as well. The assembly of the end of the tube with the plug-in part and the retaining spring thus requires a significant effort in mounting.

SUMMARY OF THE INVENTION

In order to reduce this effort and to lower the equipment costs associated with the preparation of the end of the tube for the process of insertion, the present plug-and-socket connector is formed according to the invention so that the plug-in part has an annular retaining flange on its insertion side and is provided with a circular recess into which the end of the tube can be pressed by deformable expansion of the tube wall and that the retaining spring is provided with a central clamping ring which can be slipped over the tubular connecting piece of the plug-in part immediately next to the retaining flange.

Mounting is thereby clearly simplified in that, first, the plug-in part is fastened by means of an expansion at the end of the tube and then the retaining spring is clipped over the tubular area of the plug-in part with the tube ring and is supported on the retaining flange.

Moreover, through use of the semicircular arches at each end of the elastic tabs and lateral supporting flaps, a significant reinforcement of the retaining force is effected with the present plug-and-socket connector where the projecting supporting edges of the supporting tabs can advantageously dig in somewhat into the retaining flange and the inner wall of the recess until the semicircular arches come to abut them

BRIEF DESCRIPTION OF THE DRAWINGS

An embodiment example of the invention is represented in the drawing and will be explained in more detail below. It shows:

FIG. 1, the new retaining spring constructed in accordance with the present invention in a side view with partial section along line I—I in FIG. 2, FIG. 2, the same retaining spring in a front view, FIG. 3, the same retaining spring in a plan view, FIG. 4, the tubular plug-in part in longitudinal section along line IV—IV in FIG. 5, FIG. 5, the same tubular plug-in part in front view in the direction of the arrow A, FIG. 6, the end of a section of tubing with mounted plug-in part and retaining spring, FIG. 7, the same prepared tube end during introduction into the receiving part, FIG. 8, the finished plug-and-socket connector after engagement of the retaining spring, and FIG. 9, the same plug-and-socket connector under the action of high pressure.

DETAILED DESCRIPTION

The invention represented in the figures relates to a detachable plug-and-socket connector for high-pressure lines, particularly for brake lines in the manufacture of motor vehicles, where the plug-and-socket connector must have an especially high retaining force.

As is apparent particularly from FIGS. 6 and 7, the plug-and-socket connector consists of a cylindrical receiving part 1 and a tubular plug-in part 3 with an annular retaining flange 4 on its insertion side as well as a separate retaining spring 5 of spring steel.

The receiving part 1 is preferably made of plastic and included of a cylindrical housing wall 6 having a central receiving space 2 arranged in several steps and a tubular connecting channel 7 which can be connected in a known manner to the end of a brake line (not represented). Within the receiving space 2 is an area 2a with a diameter D1 which corresponds to the outer diameter of the tube end 8 to be introduced. A circular groove 9 to receive a sealing ring 10 is formed approximately in the middle of the area 2a.

The tubular plug-in part 3 is preferably made of aluminum or a similar soft metal and has, as can be seen from FIGS. 4 and 5, a hole 11 appropriate to receive the high-pressure line 8. On the side opposite the retaining flange 4, the plug-in part 3 is provided with a circular recess 12, trapezoidal in cross section, into which the tube end 8 can be inserted and thereby be axially fixed by deformable expansion (FIG. 6).

The retaining spring 5 shown in FIGS. 1 to 3 preferably includes two elastic tabs 13 that extend conically and whose ends closest to the axis are provided with a central clamping ring 14 that can be inserted over the tubular plug-in part 3 immediately adjacent to the retaining flange 4. The ends of the elastic tabs 5 [sic;13] closest to the axis have a semicircular arch 15 at the front side (in the direction of insertion of the plug-and-socket connector) of the clamping ring 14 and the elastic tabs are guided inwardly at their ends standing out obliquely outwards over a short arch 16 with a radial ridge 17. This ridge is provided at a distance from the ends of the tabs closest to the clamping ring with an elastic projection 18 that is directed away from and approximately parallel to the clamping ring where said elastic projection stands out from the receiving part in the mounted state of the retaining spring 5.

Supporting tabs 19 are formed on the two longitudinal sides of the elastic tabs 5 with lower supporting edges 20 and upper supporting edges 21 which project slightly over the semicircular arches 15 and 16 of the elastic tabs 5. These additional supporting tabs 19 curve slightly inwardly from the elastic tabs 5 so that they lie on a semicircular arch concentrically with the clamping ring 14.

The supporting tabs 19 formed on both sides of the elastic tabs 13 serve to reinforce the supporting force where the supporting edges 20 and 21 projecting over the semicircular arches 15 and 16 under the action of the high pressure dig into the retaining flange 4 and the inner wall 23 until the semicircular arches 15 and 16 come to abut them As can be seen from FIG. 6 the tubular plug-in part 3 is pushed with the retaining flange 4 in the direction of insertion of the plug-and-socket connector onto the end 8 of the tube of the high-pressure line and is then pressed into the circular recess 12 of the plug-in part 3 by deformable expansion of the tube wall. The retaining spring 5 is clipped onto the outer wall of the plug-in part 3 with the clamping ring and the end 8 of the tube is ready for the production of a detachable plug-in connection with the receiving part 1.

For this purpose the receiving space 2 is subdivided into the following areas: The enlarged area 2B for the reception of the retaining flange 4 is adjacent to the aforementioned area 2A for the reception of the end 8 of the tube at its outward end. Following this is a conically expanding area 2C which forms a circular recess 22 for the reception of the retaining spring 5. This recess 22 terminates with a terminal wall 23 running inwardly radially on which the introduced retaining spring 5 is supported opposite to the direction of insertion with its elastic tabs 13 and supporting tabs 19. The beginning of the receiving space 2 forms an area 2D whose diameter is equal to the diameter of the area 2B.

As can be seen from FIG. 8, the elastic projections 18 project through this initial area 2D in the mounted state of the retaining spring 5 far enough that they can easily be grasped with a tool and, for the removal of the plug-and-socket connector, pressed together until the elastic tabs 13 and the supporting tabs 19 go through the initial area 2D.

We claim:

1. Detachable plug-and-socket connector for high-pressure lines, comprising:
    a cylindrical receiving part, said receiving part having a circular recess and a radial terminal wall defining a central receiving space;
    a tubular plug-in part adapted to receive and fix an end of a tube and being insertable into said central receiving space, said plug-in part having a retaining flange and a circular recess, said circular recess having a trapezoidal cross section into which an end of said tube end can be pressed by deformable expansion of a wall of the tube; and
    a spring steel retaining spring having a central clamping ring and conically formed elastic tabs, said central clamping ring being adapted to be slipped over the plug-in part and positioned adjacent said retaining flange and said conically formed elastic tabs having first ends integral with said clamping ring and second ends standing out obliquely, said second ends adapted to elastically engage said circular recess and said radial terminal wall of the cylindrical receiving part.

2. The detachable plug-and-socket connector of claim 1 characterized by the fact that said first ends of said elastic tabs have a semicircular arch and the second ends having an inward arc and a radial ridge, and an elastic projection extends from the second ends approximately parallel to said clamping ring.

3. The detachable plug-and-socket connector of claim 1 characterized by the fact said elastic tabs have at least one supporting tab, said supporting tab having a lower supporting edge that projects over said semicircular arch of the elastic tabs and an upper supporting edge.

4. The detachable plug-and-socket connector of claim 3 characterized by the fact that at least one said supporting tab is support on said elastic tabs, said supporting tab being bent inwardly from the elastic tabs such that the supporting tab forms a semicircular arch concentrically with the clamping ring.

5. Detachable plug-and-socket connector for high-pressure lines, comprising:
    a cylindrical receiving part having a circular recess and radial terminal wall defining a central receiving space;
    a tubular plug-in part adapted to receive and fix an end of a tube and being insertable into said central receiving space, said plug-in part having a retaining flange and a circular recess into which an end of said tube end can be pressed by deformable expansion of a wall of the tube; and
    a retaining spring having a central clamping ring and conically formed elastic tabs, said central clamping ring being secured around the plug-in part and said conically formed elastic tabs having first ends and second ends, said first ends being secured to said clamping ring and having a semicircular arch, said second ends having an inward arc and a radial ridge, an elastic projection extends from the second ends, supporting tabs affixed to said elastic tabs, said supporting tabs having lower supporting edges that project over said semicircular arch and upper supporting edges, said supporting tabs being bent inwardly from the elastic tabs such that the supporting tabs form a semicircular arch concentrically with the clamping ring, whereby said retaining spring elastically engages said circular recess and said radial terminal wall of the cylindrical receiving part to secure the plug-in part in the receiving part.

6. Detachable plug-and-socket connector for high-pressure lines, comprising:
    a cylindrical receiving part having an interior wall defining a central receiving space;
    a tubular plug-in part adapted to receive and fix an end of a tube and being insertable into said central receiving space, said plug-in part having a retaining flange and a circular recess defined in an interior wall of said plug-in part into which an end of said tube end can be pressed by deformable expansion of a wall of the tube; and
    a retaining spring having a central clamping ring secured around the plug-in part, conically formed elastic tabs having one end affixed to said central clamping ring and a second end, an elastic projection extending from said second ends, and at least one supporting tab affixed to said elastic tabs, whereby upon insertion of said tubular plug-in part to said cylindrical receiving part the retaining spring elastically engages the interior wall of the central receiving space to secure the plug-in part in the receiving part and the elastic projection extends beyond the cylindrical receiving part.

* * * * *

UNITED STATES PATENT AND TRADEMARK OFFICE
CERTIFICATE OF CORRECTION

PATENT NO.    : 6,471,252 B1                                                            Page 1 of 1
DATED         : October 29, 2002
INVENTOR(S)   : Erminio Moretti et al.

It is certified that error appears in the above-identified patent and that said Letters Patent is hereby corrected as shown below:

Column 1,
Line 13, replace "A2;" with -- A2. --.
Line 33, delete "according to the invention".
Line 46, delete the first occurence "the".
Line 52, replace "them" with -- them. --.

Column 2,
Line 23, replace "included" with -- includes --.
Line 67, replace "them" with -- them. --.

Signed and Sealed this

Eleventh Day of March, 2003

JAMES E. ROGAN
*Director of the United States Patent and Trademark Office*